March 6, 1962 A. M. SAREM 3,023,606
METHOD AND APPARATUS FOR THE DETERMINATION OF THE
GAS-LIQUID EFFECTIVE PERMEABILITY
RATIO OF CORE SAMPLES
Filed March 4, 1959 2 Sheets-Sheet 1
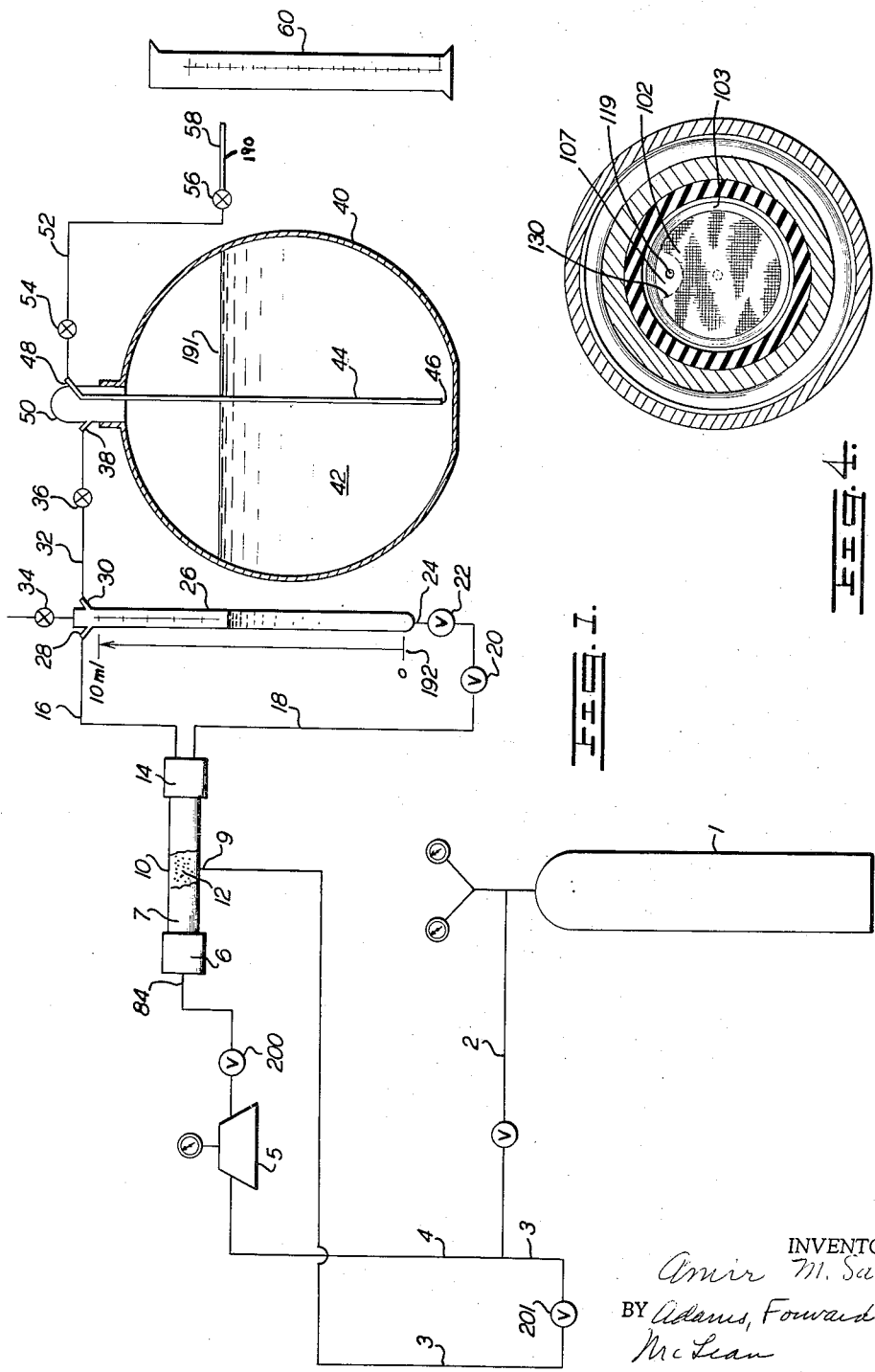
INVENTOR.
Amir M. Sarem
BY Adams, Forward &
McLean
ATTORNEYS

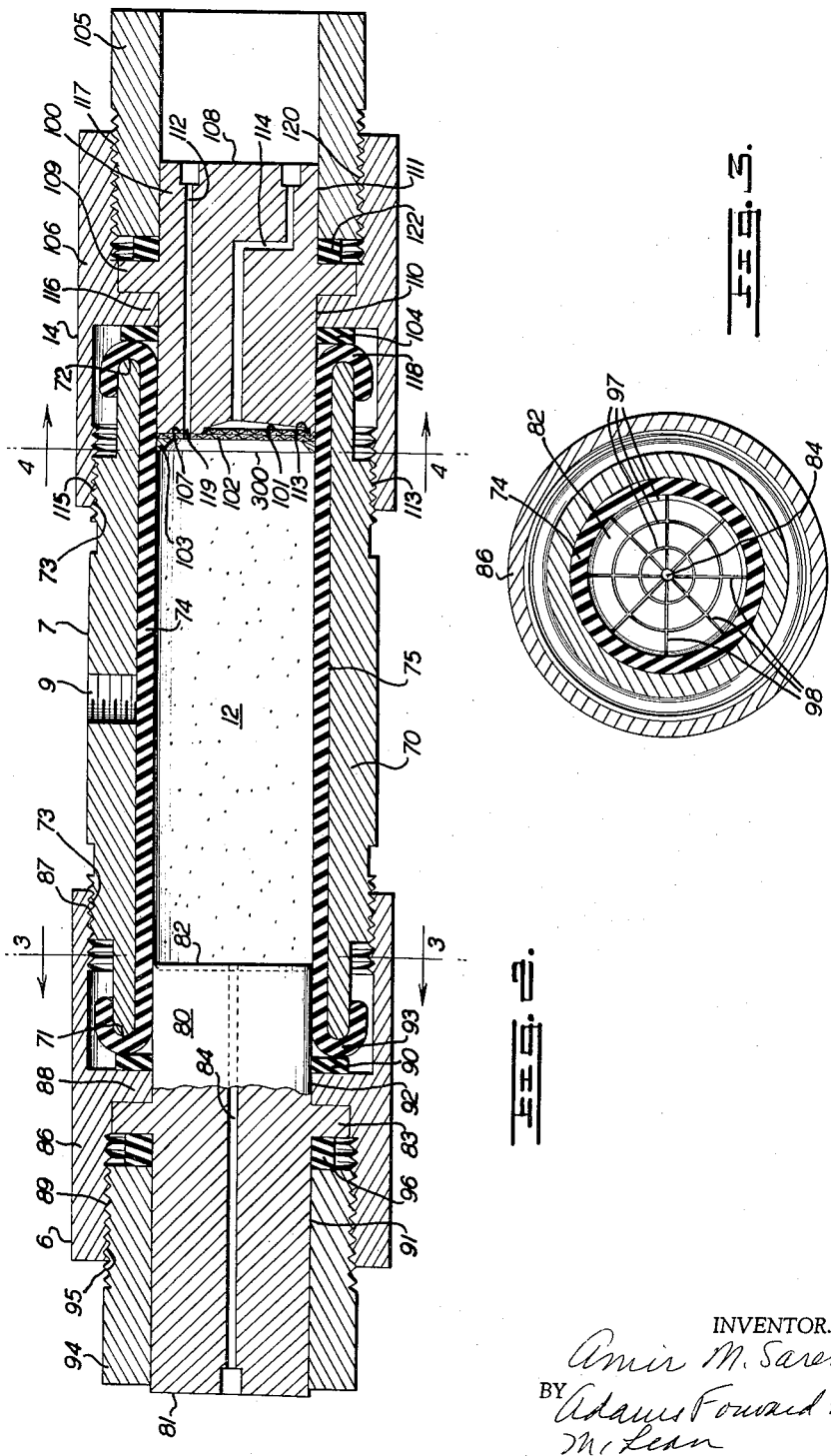

United States Patent Office 3,023,606
Patented Mar. 6, 1962

3,023,606
METHOD AND APPARATUS FOR THE DETERMINATION OF THE GAS-LIQUID EFFECTIVE PERMEABILITY RATIO OF CORE SAMPLES
Amir M. Sarem, Tulsa, Okla., assignor to Sinclair Research Inc., a corporation of Delaware
Filed Mar. 4, 1959, Ser. No. 797,113
9 Claims. (Cl. 73—38)

This invention relates to a method for determining the feasibility of a gas drive through a subterranean oil-bearing formation and to novel apparatus employed in determinations of this character.

Gaseous mediums are sometimes driven through a subterranean oil-bearing formation, as from an input well to an output well, to recover additional quantities of oil following a substantial cessation of free oil flow to the site of a recovery well. Before conducting a gas drive, however, an indication of the feasibility of such a procedure is highly desirable. For instance, with respect to economic feasibility, an indication that the potential oil recovery from such a drive will merit the expense of conducting this procedure.

For reservoir calculations and predictions of oil recoveries, one of the required factors is the rock characteristics of the reservoir samples. One of these required characteristics is the gas-liquid, e.g. oil, effective permeability ratios by which instantaneous gas-oil ratio of a reservoir could be calculated. The determination of the effective permeability ratio of a reservoir rock sample demands a non-intermittant instantaneous-type test, wherein the gas injection and the oil recovery can be determined instantaneously and continually once a rock core is prepared for the test.

There are several such methods of gas and oil measurements known to the oil industry at the present time, but none of these methods provides instantaneous accurate readings of both fluids continually. In one instance, the oil is measured by dropping it through a needle assembly into a receiving calibrated burette. This procedure can cause error due to the adhesion of oil to the wall of the burette as well as the foaming of effluent oil at the needle tip. In the operation of this procedure, the gas is measured at the core inflow face by forcing water from one vessel, using air pressure into a series of three vessels of different capacities, which would be used one at a time, thereby displacing the gas from the top of the calibrated vessel. The quantity of gas injected in the core is determined by the rise of water level in these vessels. However, in order to keep a constant injection pressure, constant supervision is required because of the continuous change in the water level between the first vessel, the level of which constantly drops, and anyone of the several secondary vessels that is being used, the level of which constantly rises until it is switched to the next reservoir or shut off when the capacity is reached. Also, when the secondary reservoirs are switched, a sudden disturbance is encountered which produces a rise in the inlet pressure and thereby causing inaccurate instantaneous gas measurements.

Another type of gas measuring device consists of one long vessel (about 4 feet) of varying diameter and having three sections, the smallest diameter and thereby the most accurate section being on the top. This vessel is connected to a gas outlet from the top and to a leveling bottle from the bottom. Different amounts of injected gas are determined by holding the leveling bottle at the same level of liquid in the vessel and reading the corresponding volumes. This method of gas measurement, while fairly accurate, requires a big leveling bottle and a constant raising and lowering of this bottle by manual or mechanical means which call for complex instrumentation or extra manpower. When following the present invention, however, these problems are substantially alleviated.

An object of the present invention is the provision of a method for determining the feasibility of a gas drive through subterranean oil-bearing formations. Another object of the present invention is the provision of novel apparatus useful in determining the feasibility of a gas drive through subterranean oil-bearing formations.

The operation of the method and description of the apparatus of this invention will be more clearly understood by reference to the drawings in which the apparatus is illustrated. When employed in the drawings, like numerals denote similar parts.

FIGURE 1 represents an elective arrangement of various components included in the apparatus of this invention including a gas and oil core holder-separator means;

FIGURE 2 provides a side sectional view of the gas and oil core holder-separator means;

FIGURE 3 provides a front view of a core plate for the inlet end piece employed in the gas and oil core holder-separator means; and FIGURE 4 provides a front view of the gas and oil separator group of the gas and oil core holder-separator means.

Referring to FIGURE 1, there is shown gas source 1, which can be a cylinder containing pressurized nitrogen, gas line 2 for conducting gas to core sealing gas line 3 and core passage gas line 4, which includes gas pressure regulator 5 and valve 200. Gas line 4 leads to opening 84 of inlet end piece 6 while core sealing gas line 3, containing valve 201, leads to an opening at 9 of tubular core holding member 7 of gas and oil core holder-separator means 10.

Gas and oil core holder-separator means 10 includes inlet end piece 6 for conducting gas to oil containing rock core 12, which is disposed within core holding chamber 7. The gas passes through, and carries oil from core 12 to gas and oil separator piece 14 where the oil and gas are separated wtih the gas being conducted to line 16 and the oil being conducted to oil line 18. Line 18 passes through oil adjusting valve 20 and stop cock valve 22 to an opening at 24 in a graduated oil receiving and measuring chamber, e.g. a burette, oil burette tube 26, which includes gas inlet 28 connected to line 16, gas outlet 30 connected to gas line 32, and gas valve 34. Gas line 32 contains gas valve 36 and leads to gas inlet 38 of a gas collecting and measuring chamber, flask 40, which is uncommunicative with the atmosphere and includes gas displaceable liquid, e.g. water 42, water transferring conduit 44 with gas chamber water inlet 46 and gas chamber water outlet 48, and atmosphere sealing bell 50. Water line 52 contains water valve 54 and leads from water outlet 48 to water valve 56 of capillary water conduit 58, conveniently about 5 ml. in length, which is adapted to conduct water to water measuring chamber 60, which can conveniently be a graduated cylinder.

Referring to FIGURE 2, a descriptive side sectional view of the gas and oil core holder-separator means including inlet end piece 6, separator piece 14 and oil containing core 12 mounted within core holding chamber 7 which contains opening 9. Core holding chamber 7 includes tubular piece 70 including aperature 9, a first end 71, a second end 72, and external threads 73 at each of the ends. Tubular resilient member 74 is mounted to closely fit the inside walls 75 of, and lip around ends 71 and 72 of, tubular piece 70 in a manner to seal core 12 snugly therein when gas is emitted through opening 9.

Cylindrical member 80, which can be made of plastic material, e.g. Lucite, of inlet end piece 6 comprises a front plate 81, a core plate 82, a circumferential flange 83 dividing the external tubular portion of member 80 into a front portion 91 and a core portion 92, and a centrally located opening 84 which is axially disposed therein. Member 80 is mounted with core plate 82 in a gas flow relationship with core 12 of chamber 7 using connecting tubular member 86 containing internal threads 87 adapted to threadedly engage the matching threads 73 at end 71 of chamber 7, an annular internal flange 88, and internal threads 89. A washer 90, made of resilient material, e.g. rubber, is placed snugly around core portion 92 of member 80 and biased against lip 93 of resilient member 74 and annular internal flange 88 of member 86 is disposed in between washer 90 and annular internal flange 88 of member 86 to sealingly engage member 86 with core holding chamber 7. Tubular gas line connecting piece 94 with external threads 95 engaged by matching internal threads 89 of member 6, biases resilient sleeve 96 against circumferential flange 83 to securely and sealingly mount member 80 within piece 6.

In FIGURE 3, taken along line 3—3 of FIGURE 2, a front view of core plate 82 is shown having one or more concentric grooves 97 disposed uniformly therein and extending radially outward from a centrally located opening 84 which is axially disposed within the end plate. Also extending radially from opening 84 and passing through grooves 97 are a plurality of uniformally disposed grooves 98. Grooves 97 and 98, preferably with uniformally sized channels, provide uniform contact of the core sample face with gas introduced through opening 84.

Referring back to FIGURE 2, the gas and oil separator group includes cylindrical fluid conducting member 100, metallic mesh screen 101 (e.g. 50 mesh brass screen), semi-permeable membrane 102, washer 103, washer 104, securing member 105, and connecting tubular member 106. Liquid conducting member 100 comprises a front plate or face 107, a back plate 108, a circumferential flange 109 dividing the external tubular portion of member 100 into a front portion 110 and a back portion 111, an axially disposed, off-center gas channel or conduit 112, a circular recess 113 disposed within front plate 107 which is uncommunicative with channel 112 and adapted to closely encase screen member 101 while tapering into axially disposed liquid, e.g. oil, channel 114.

Fluid conducting member 100 is mounted with front plate 107 in a fluid receiving relationship with core 12 of chamber 7 using connecting tubular member 106 containing internal threads 115 adapted to threadingly engage the matching threads 73 at end 72 of chamber 7, an annular internal flange 116, and internal threads 117. Washer 104 is placed snugly around front portion 110 and biased against lip 118 of resilient member 74 and annular internal flange 116 of member 106 is disposed in between washer 104 and circumferential flange 109 of member 100 to sealingly engage member 100 with core holding chamber 7. Circular semi-permeable membrane 102, with a concentric cutaway portion on one end and glued to a bevelled washer 103 is firmly disposed in between core 12 and front plate 107 to cover recess 113 containing screen 101 in a position uncommunicative with opening 119 of gas channel 112.

Securing member 105 with external threads 120 engaged by matching internal threads 117 of members 106 biases resilient sleeve 122 against circumferential flange 109 to securely and sealingly mount member 100, screen 101, semi-permeable membrane 102, washer 103, and end 72 of chamber 7 within member 106.

In FIGURE 4, taken along line 4—4 of FIGURE 2, a front view of the arrangement of the gas and oil separator group is shown with projection or washer 103 biasing circular semi-permeable membrane 102 with a concentric cutaway portion 130 against front plate 107 (see FIGURE 2) of member 100 while clearing gas opening 119.

Washer 103 can conveniently be comprised of a .04 inch thick, .06 inch wide at the bigger surface, 30° bevelled washer made out of a metal, non-corrosive to brine and having a Brinell hardness (3000 kg.) of at least about 120. It is preferably glued to front plate 107 of member 100, which can be made of Lucite, through membrane 102. This washer is designed to provide a maximum exposure of the core face to the semi-permeable membrane and gas conduit and to withstand the pressure of sleeve 122 when it is glued to plate 107 and placed against core 12 in core holding chamber 7 of the Hassler type. It keeps gas from breaking through the semi-permeable membrane, it will not chip, and thereby tends to prevent the sleeve pressure from bursting the rubber sleeve as by blowing it through the chipped spot. The thickness of washer 103 is important. Instantaneous absorption of oil droplets by the membrane, usually made of cloth, is not possible, causing an inherent lag when thicker washers are used, and thinner washers promote gas breakthrough into the continuous oil column. The function of the membrane is to absorb any and all of the oil emerging out of the out-flow face of the core instantaneously by capillary action while keeping out gas.

Semi-permeable membrane 102 can be comprised of a double layer of 60 gauge rayon cloth glued together and to the periphery of plate 107 by Duco Cement leaving gas exit hole 119, preferably ¼ inch in diameter, on the end piece uncovered. This cloth is soaked in a mineral oil ($C_{10}$–$C_{15}$), e.g. Klearol for several days, e.g. 10, in order to acquire a gas-oil displacement pressure of 9 to 9½ inches of water by decreasing the size of the capillary holes.

Metallic screen 101 can be comprised of 50 mesh brass screen cut to fit in circular recess 113 of plate 107 as shown in the drawing, leaving the gas exit hole uncovered. This screen supports the semi-permeable membrane and should not be cemented to plate 107 as it reduces the permeability. The cloth membrane is designed to hold this screen in place once the screen is cut to fit in the end piece tightly.

Liquid conducting member 100 can be machined such that it provides a ¼ inch gas exit hole, preferably as close as practicable, e.g. $\frac{1}{16}$ inch from the top wall, and having a bevelled washer such as washer 103 or a $\frac{1}{16}$ inch wide shoulder to allow space for gluing of the cloth membrane to face 107, and a ⅛ inch oil exit hole in the center with respective provisions to hold the brass screen and cloth membrane. The screen seat should be bevelled, e.g. about 10° to slope toward the oil exit hole drilled in the center of the end piece as shown in the drawing to help gas molecules slip out of the end piece while attempting to saturate the gas-oil separation end piece with oil and eliminating undesirable capillary action of the brass screen to hold air, which would be promoted if the brass screen is held too close to the face of the end piece.

The gas measuring chamber consisting of a 6000 ml. flask, 0–5 ml. microburette and several graduated cylinders as shown in the drawing can be employed. In order to obtain acceptable measurements, the microburette should be held horizontal and can be at the same level as that of the water in the flask at the beginning of the experiment. When using this method, gas measurements can be made with an accuracy of 4 parts in 1000 for the first five cc. gas measurement and 1% accuracy for up to 6000 ml. gas throughout.

If the microburette is not held horizontal or at the same level as that of the water in the flask, then some negative or positive pressure differential may exist between microburette and the flask which can cause less accurate readings at the start of the experiment when the best accuracy is desired.

In carrying out the method of this invention, a core sample 12, containing outflow face 300 and saturated with oil to determine its pore volume, e.g. its dry weight compared with its weight with oil, is mounted within core holding chamber 7 which can be a container or casing of metallic material such as anodized aluminum. In operation, using FIGURE 1, after the sample is mounted in chamber 7, an ample supply of liquid in flask 40 is insured and microburette 58 is zeroed in, i.e. insure that line 52 and burette 58 are full of water with burette 58 on an even level, position 190 as indicated, with water level 191 to avoid a pressure differential factor and to get volume per volume displacement of water for the entering gas. After zeroing in microburette 58, gas valve 36 is closed and oil burette tube 26 is zeroed in, i.e. insuring that oil line 18 is full of oil (a capillary pressure of 9″, for example, will prevent oil drainback in line 18) and tube 26 contains oil at its zero point as indicated by numeral 192. Previously, the top of burette 26, while maintained at 2 inches below the outflow face of the core, was connected to (a) the gas outlet of the gas-oil separator end piece, (b) the bleed valve, which is necessary for zeroing the apparatus, at the start, and (c) the gas measuring device. Gas valves 34 and 36 are opened now to equalize the air pressure through lines 16 and 32, tube 26 and flask 40, to get air pressure stability thus avoiding the loss of zero conditions in burette 58. Gas valve 36 is closed followed with the closing of gas valve 34, the reopening of valve 36 and the apparatus is ready for use.

Still referring to FIGURE 1, pressurized nitrogen from cylinder 1 is passed through gas line 2 to lines 3 and 4. The nitrogen received in line 3 is passed through opening 9 and pressures rubber member 74, as shown in FIGURE 2, against core 12 to seal core 12 tightly within chamber 7. The nitrogen received in line 4 is regulated by gas pressure regulator 5 to a pressure of generally from about 2 to 90 p.s.i.g. however in this example to about 30 p.s.i.g. to provide a pressure regulation of a few inches of water to 100 p.s.i.g. at the point the gas is taken to the inlet of the core sample and is conducted to opening 84 of inlet end piece 6.

Referring to FIGURE 2, the pressurized nitrogen gas passes through opening 84 to several channels (as shown in FIGURE 3) in core plate 82, through core 12 carrying oil contained therein with the oil and gas being guided within bevelled washer 103. The oil permeates through semi-permeable membrane 102, brass screen 101, channel 114 and as shown in FIGURE 1, through line 18 into oil burette tube 26. Referring back to FIGURE 2, semi-permeable membrane 102, although permeable to liquid, e.g. oil passage therethrough, is impermeable to gas passage, thus the gas is received by exposed opening 119 of channel 112 and is conducted to gas line 16, as shown in FIGURE 1, passing through inlet 28 and outlet 30 of tube 26, line 32, inlet 38 of flask 40 and displaces water contained therein through conduit 44, line 52, conveniently a surgical tubing, burette 58, and into graduated cylinder 60 where it is measured. This flask is first calibrated by entering known volumes of gas into the flask and receiving the effluent water in the microburette and graduated cylinder after the water level has been zeroed on the microburette. It is essential to hold the microburette horizontal and it can be held at the same level as the water level in the flask, because of transferring difficulties which would otherwise be encountered. Burette 58 can be maintained at an even level with the level of water in flask 40 throughout the operation to avoid a pressure differential factor and obtain a volume for volume displacement of gas for water. Thus the volume of water obtained in burette 58 is a measure of the volume of gas recovered in flask 40. Upon substantial cessation of an increase in the volume of oil in tube 26, i.e. when a high instantaneous gas to oil ratio is attained, e.g. of about 1000 to 1, the supply of nitrogen gas is discontinued, and the volume of oil recovered is noted, which is 4.75 ml. in this instance. The volume of water in burette 58 is also noted and is 5 ml.

The gas-oil effective permeability ratio of the core can be determined using the figures for the volumes of oil and water recovered. The percentage of gas saturation is the amount of pore volume occupied by the gas. This can be accomplished with the following Welge equation:

$$S_2 = S_{ave} - f_o Q_1$$

$$\frac{K_g}{K_o} = \frac{1-f_o}{\frac{\mu_o}{\mu_g} \cdot f_o}$$

where $f_o$ = Fraction of oil in flowing stream
$K_g$ = Effective permeability to gas
$K_o$ = Effective permeability to oil
$S_{ave}$ = Average gas saturation =

$$\frac{\text{Vol. oil out}}{\text{Pore volume}}$$

$S_2$ = Outflow gas saturation
$\mu_g$ = Gas viscosity
$\mu_o$ = Oil viscosity
$Q_1$ = Cumulative gas injections =

$$\frac{\text{Vol. gas out} + \text{oil out}}{\text{Pore volume}}$$

It is claimed:

1. Apparatus for the determination of the gas-liquid effective permeability ratio of core samples comprising gas-liquid core holder separator means containing a tubular core holding member defining a core chamber and adapted to mount a core sample for said determination, an inlet end piece at one end of said chamber in a gas conducting relationship, and a gas-liquid separator piece at the other end of said chamber in a gas and liquid separating relationship with said chamber; said gas-liquid separator piece containing a liquid conduit means for separated liquid and a primary gas conduit for separated gas; pressurized gas supply means in a gas communicating relationship with the inlet end piece; a liquid receiving and measuring chamber containing secondary gas conduit means, in liquid receiving communication with said liquid conduit and adapted to measure the volume of separated liquid; a gas collecting chamber, uncommunicative with the atmosphere containing a gas displaceable liquid, a displaced liquid transfer conduit adapted to transfer gas-displaced liquid out of said chamber, said gas collecting chamber being in gas receiving relationship with said primary gas conduit by way of the secondary gas conduit and adapted to receive the separated gas; a displaced-liquid measuring chamber adapted to receive the displaced liquid from the transfer conduit.

2. The apparatus of claim 1 wherein a capillary liquid conduit means is in liquid communication with said transfer conduit, said capillary conduit means leading to said displaced-liquid measuring chamber.

3. The apparatus of claim 2 wherein the gas liquid separator piece includes a generally cylindrical member adapted to recover gas and liquid from said core holder and having a front face, said primary gas conduit means being in said member and leading from the front face, a recess disposed within the front face and uncommunicative with the primary gas conduit means, said liquid conduit means being uncommunicative with the primary gas conduit means and disposed in the cylindrical member, said recess leading into the liquid conduit means; a screen member, corresponding in configuration to said recess and mounted closely within the recess; a semi-permeable membrane impermeable to gas passage mounted to cover the screen but not the primary gas conduit means and adapted to allow liquid to permeate therethrough; and a projection member corresponding to the peripheral edge of and securing the membrane to the front face.

4. A gas and liquid separator apparatus adapted to separate gas and liquid recovered from a core sample comprising a generally cylindrical member adapted to recover gas and liquid from a core holder and having a front face, gas conduit means in said member and leading from the front face, a recess disposed within the front face and uncommunicative with the gas conduit means, and liquid conduit means uncommunicative with the gas conduit means and disposed in the cylindrical member, said recess leading into the liquid conduit means; a screen member, corresponding in configuration to said recess and mounted closely within the recess; a semi-permeable membrane impermeable to gas passage mounted to cover the screen but not the gas conduit means and adapted to allow liquid to permeate therethrough; and a projection member corresponding to the peripheral edge of and securing the membrane to the front face.

5. The apparatus of claim 4 wherein the gas conduit is located near the top edge of the cylindrical member, the liquid contact means is located near the center of the cylindrical member, and the projection is a metallic bevelled member with its small edge being directed away from said front face.

6. A gas and liquid separator apparatus adapted to separate gas and liquid recovered from a core sample comprising a generally cylindrical member adapted to recover gas and liquid from a core holder and having a front face, gas conduit means in said member and leading from the front face, a recess disposed within the front face and uncommunicative with the gas conduit means, and liquid conduit means uncommunicative with the gas conduit means and disposed in the cylindrical member, said recess including a screen seating portion and a tapering portion leading into the liquid conduit means; a screen member, corresponding in configuration to the screen seating portion of said recess and mounted closely within the seating portion of the recess; a semi-permeable membrane impermeable to gas passage mounted to cover the screen but not the gas conduit means and adapted to allow liquid to permeate therethrough; and a projection member corresponding to the peripheral edge of and securing the membrane to the front face.

7. The apparatus of claim 6 wherein the gas conduit is located near the top edge of the cylindrical member, the liquid contact means is located near the center of the cylindrical member, and the projection is a metallic bevelled member with its small edge being directed away from said front face.

8. The apparatus of claim 7 wherein the semi-permeable member is rayon cloth soaked in the liquid and the bevelled member has a Brinell hardness of at least about 120.

9. A method for determining the gas-liquid effective permeability ratio of core samples comprising saturating a core sample with liquid, mounting the core sample in the core chamber of a gas-liquid core holder separator means containing a gas inlet end piece mounted at one end forward of said chamber, a gas-liquid separator piece mounted at the other end in a gas and liquid separating relationship with the core sample; said gas-liquid separator piece comprising (a) a tubular fluid conduit means containing a front plate and a back plate, gas conduit means disposed within the front plate, a recess disposed within the front plate and uncommunicative with the gas conduit means, and liquid conduit means uncommunicative with the gas conduit means and disposed in the fluid conduit means, said recess tapering into the liquid conduit means, (b) a screen member corresponding in configuration to said recess and mounted closely within the recess, (c) a semi-permeable membrane impermeable to gas passage, mounted to cover the screen but not the gas conduit means and adapted to allow liquid to permeate therethrough, and (d) a metallic bevelled member corresponding to the peripheral edge of, and secured to, the front plate which is biased against the core sample; conducting pressurized gas through said inlet end piece, through the saturated core sample, to drive gas and liquid to the front plate of the gas-liquid separator piece where the gas passes into the gas conduit means and the liquid is directed by the bevelled member to the semi-permeable membrane, permeates through the membrane, the screen and into the liquid conduit means; conducting the liquid from said liquid conduit means to a fluid receiving and measuring chamber containing a secondary gas conduit means, the measuring chamber measuring the volume of liquid; conducting gas from said gas conduit means to a gas collecting chamber uncommunicative with the atmosphere containing a gas displaceable liquid, and a displaced-liquid siphoning conduit; passing displaced liquid to a capillary liquid conduit; collecting displaced liquid from the capillary liquid conduit in a liquid measuring chamber to indicate the volume of gas in the gas collecting chamber; and determining the gas-liquid effective permeability ratio of the core using the figures for the volumes of gas and liquid recovered.

References Cited in the file of this patent

UNITED STATES PATENTS

| | | |
|---|---|---|
| 2,534,737 | Rose | Dec. 19, 1950 |
| 2,705,418 | Reichertz et al. | Apr. 5, 1955 |